United States Patent [19]

Shimogama

[11] Patent Number: 5,412,175
[45] Date of Patent: May 2, 1995

[54] METHOD OF OPERATING AN ARC WELDING APPARATUS

[75] Inventor: Shigeru Shimogama, Kawanishi, Japan

[73] Assignee: Matsushita Electric Industrial, Co., Ltd., Osaka, Japan

[21] Appl. No.: 220,876

[22] Filed: Mar. 31, 1994

[30] Foreign Application Priority Data

Mar. 31, 1993 [JP] Japan .................................. 5-73189

[51] Int. Cl.$^6$ ................................................ B23K 9/12
[52] U.S. Cl. ............................. 219/125.1; 219/130.01; 901/42
[58] Field of Search ......................... 219/125.1, 130.01; 901/42

[56] References Cited

FOREIGN PATENT DOCUMENTS 62-54586 11/1987 Japan .

*Primary Examiner*—Clifford C. Shaw
*Attorney, Agent, or Firm*—Wenderoth, Lind & Ponack

[57] ABSTRACT

A method of operating an arc welding apparatus which controls and moves a welding wire of a welding torch and detects a weld between a work and the welding wire after completion of an arc welding, includes: a first step of cutting off a welding voltage to the welding wire to thereby extinguish a welding arc; a second step of detecting a weld state between the welding wire and the work; a third step of lifting the welding wire away from the work when the welded state is detected at the second step; a fourth step of detecting the welded state between the welding wire and the work after completion of the third step; a fifth step of impressing the welding voltage to the welding wire when a welded state has been detected at the fourth step; a sixth step of detecting the welded state between the welding wire and the work after completion of the fifth step; a seventh step of executing, when the welded state has been detected at the sixth step, at least one of the stopping of the operation of the arc welding apparatus, displaying of the welded state, and informing an operator of the welded state; and an eighth step of moving the apparatus to another location when the welded state has not been detected at the second, fourth, and sixth steps.

3 Claims, 6 Drawing Sheets

METHOD OF OPERATING AN ARC WELDING APPARATUS

BACKGROUND OF THE INVENTION

The present invention relates to a method of operating an arc welding apparatus by detecting and releasing the weld of a work with a welding wire (simply referred to as a wire hereinafter).

According to such a method of the operating arc welding apparatus, after completion of an arc welding process, a determine is made to whether or not the wire is surely bonded to the work. As one method of determining if the work is properly banded to the wire, a DC voltage is applied to the wire and then the change of the voltage is detected. More specifically, a DC voltage is applied to the wire while the work is grounded. If the work and the wire are properly welded to each other, the wire is grounded via the work, consequently decreasing the voltage approximately to zero.

The relationship between the wire and the work during at the above noted detecting time-is shown in FIGS. 8-10. FIG. 8 indicates the state where a wire 9 set at the front end of a torch 5 is completely separated away from a work 8. FIG. 9 shows the wire 9 slipping down and thus barely touching the work 8 when the welding process has been completed (described as a pseudo welding state hereinafter). Meanwhile, the wire 9 is welded to the work 8 in FIG. 10. The torch 5 is moved to a next welding process only in the state shown in FIG. 8 where the wire 9 is perfectly detached from the work 8, and in the other cases, a welding voltage is impressed to fuse the wire 9 or the welding system is halted and the welded state of the wire 9 is displayed. A fusing process for the wire 9 is needed only in FIG. 10, that is, the torch 5 can be moved to a next welding process except for the case of FIG. 10 where the wire 9 is perfectly welded to the work 8. In other words, although the torch 5 can be sent to a next process promptly subsequent to the state of the pseudo welding in FIG. 9, the fusing process has been actually carried out in the prior art.

In order to remove such inconveniences, there have been provided a welding method disclosed in, for instance, Japanese Patent Publication No. 62-54586 (54586/1987) wherein a torch is always moved a predetermined distance corresponding to the play of a wire in a direction away from a work so as to inspect the welded state between the wire and the work.

However, the method has the following inconveniences.

(1) Even when the welding is finished in the state as shown in FIG. 8, the torch 5 has to be moved after the welding process so as to inspect the welded state between the wire and the work although it is unnecessary. Therefore, the time for the welding process cannot be shortened.
(2) It is necessary to control the torch 5 to move in a direction which does not interfere with a tool or the work 8 after welding. Moreover, it is necessary for the torch 5 to separate the wire 9 in a direction away from the work 8 for each terminal point of welding. To control the torch 5 as above hinders shortening of the time for the welding process.
(3) In the case shown in FIG. 10 where the wire 9 is welded to the work 8, the wire 9 is kept clamped by a wire feeding device and therefore, the torch 5 interferes with the wire 9 if the torch 5 is moved in a direction not coincident with the feeding direction of the wire 9, thereby breaking a torch holding part.
(4) A mechanism for releasing the torch 5 after welding is needed (the prior art requires a robot for this purpose).

SUMMARY OF THE INVENTION

An object of the present invention is therefore to provide an arc welding method designed to shorten the time of a welding process by arranging a suitable operation for respective states where a work is welded to a welding wire, where a work is pseudo-welded to a welding wire, and where a work is not welded to a welding wire.

In accomplishing these and other objects, according to one aspect of the present invention, there is provided an arc welding method of operating an arc welding apparatus which controls and moves a welding wire of a welding torch and detects a weld between a work and the welding wire after completion of an arc welding, comprising: a first step of cutting off a welding voltage to the welding wire to thereby extinguish a welding arc; a second step of detecting welded state between the welding wire and the work; a third step of lifting the welding wire away from the work when the welded state has been detected at the second step; a fourth step of detecting the welded state between the welding wire and the work after completion of the third step; a fifth step of impressing a welding voltage to the welding wire when the weld has been is detected at the fourth step, thereby executing an arc spot welding; a sixth step of detecting the welded state between the welding wire and the work after completion of the fifth step; a seventh step of executing, when the welded state has been detected at the sixth step, at least one of a stopping of the operating of the arc welding apparatus, displaying the welded state, and informing an operator of the welded state; and an eighth step of moving the apparatus to another location when the welded state has not been detected at the second, fourth, and sixth steps.

According to the method as above, the welded state is detected at the second step. A next process proceeds when the welded state has not been detected, whereas the welding wire is raised upward at the third step when the welded state has been detected. If the welded state is pseudo, the welding wire is lifted so as to thereby release the state. The welded state is detected again at the fourth step. An arc welding is performed at the fifth step if the welded state has been detected at the fourth step, thus releasing the welded state. In the case where the welded state is not released even in the arc spot welding process, the apparatus is stopped, and the welded state is displayed, at the seventh step.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
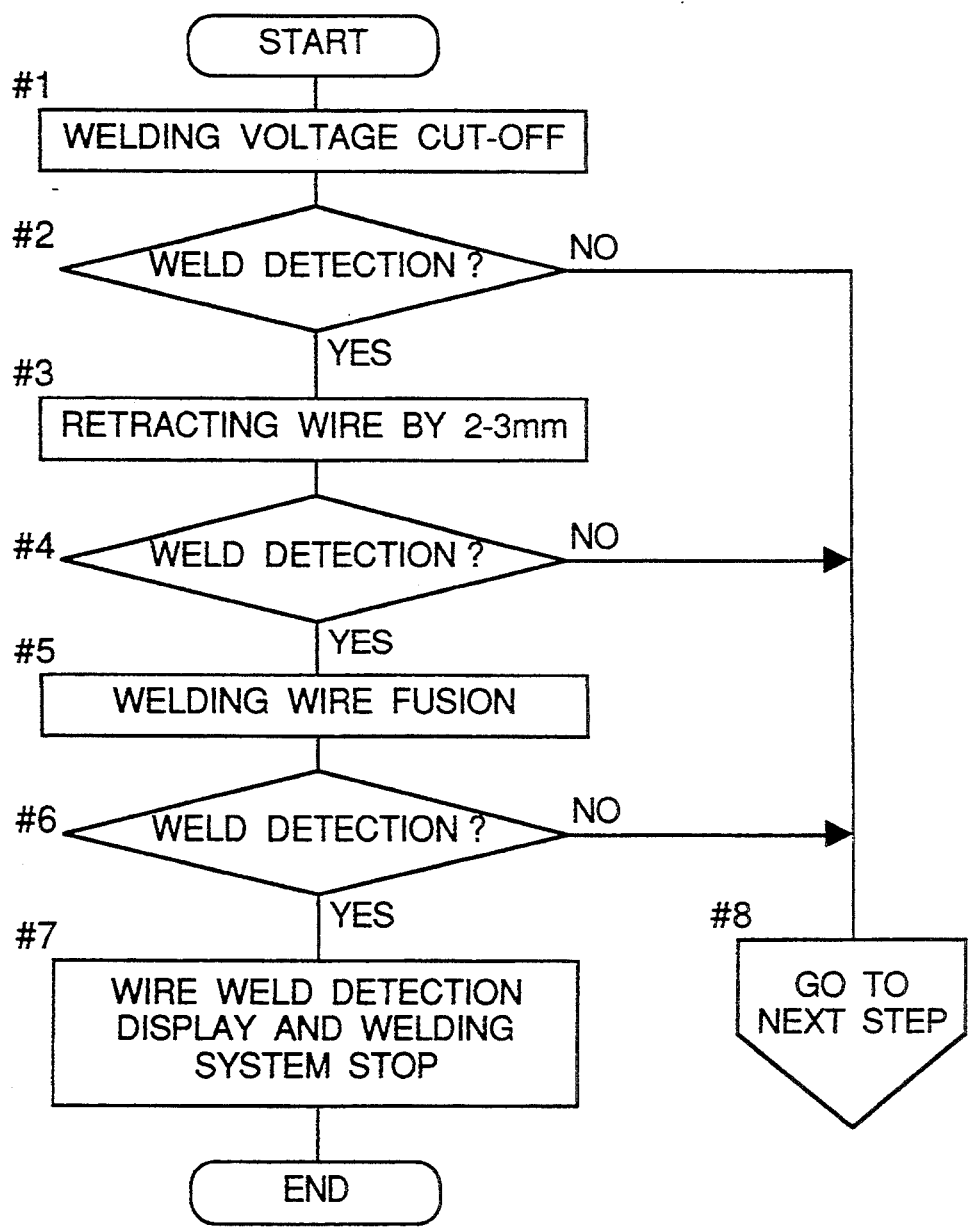
FIG. 1 is a flowchart of an arc welding method according to a first embodiment of the present invention.

Before the description of the present invention proceeds, it is to be noted that like parts are designated by like reference numerals throughout the accompanying drawings.

A first embodiment of the present invention will be depicted with reference to the corresponding drawings.

Figure 2:
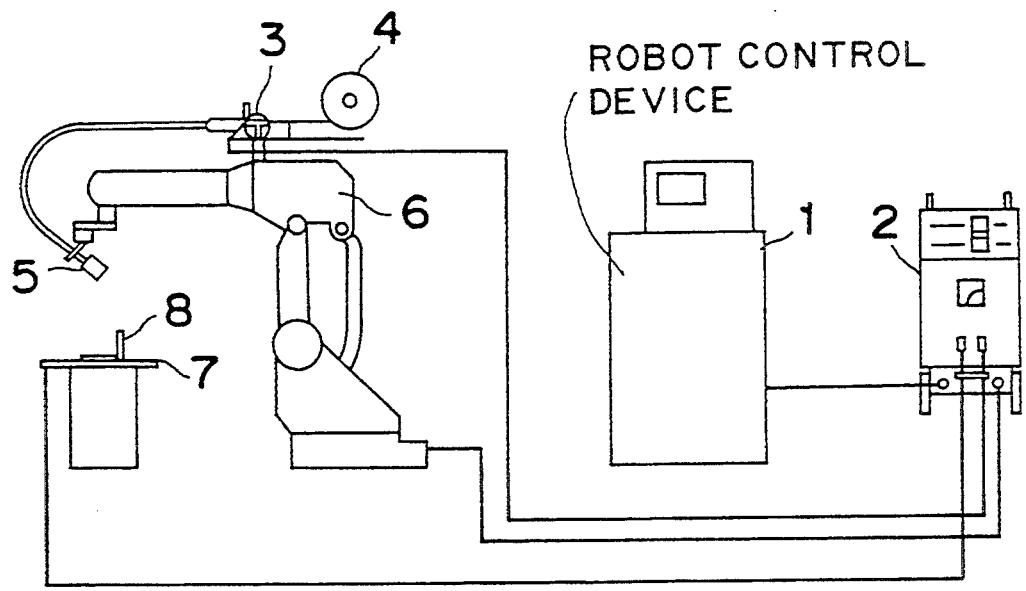
FIG. 2 is a diagram showing the constitution of a welding robot system of the embodiment of the present invention.

FIG. 2 indicates an arc welding robot system to which the first embodiment is applied. In FIG. 2 element 1 is a robot control device for controlling the arc welding robot system; element 2 is a welding source for feeding power to a work 8 via a wire 9; element 3 is a wire feeding device for feeding the wire 9; element 4 is a wire reel for winding the wire 9; element 5 is a torch for holding the wire 9; element 6 is a main body of the robot which holds the torch 5 and moves it in accordance with a pre-taught program; and element 7 is a parent metal having the work 8 mounted thereon and electrically connecting the work 8 to the welding source 2.

A wire weld detecting circuit (not shown) is built in the welding source 2 so as to detect a shortcircuit between the wire 9 and the work 8 from the level of the feedback voltage when a DC voltage is impressed between the wire 9 and the work 8 after the wire 9 is welded to the work 8. A description of the detecting principle and the circuit structure related to the detection of the weld will be abbreviated here.

Figure 3:
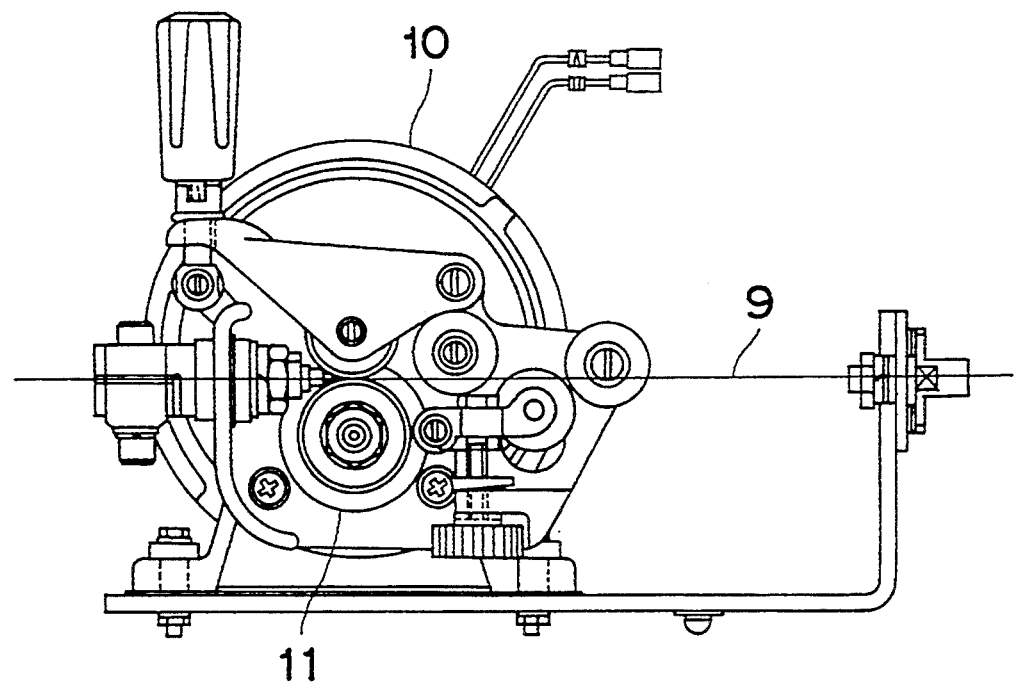
FIG. 3 is a side sectional view of a wire feeding device of the embodiment.
Figure 4:
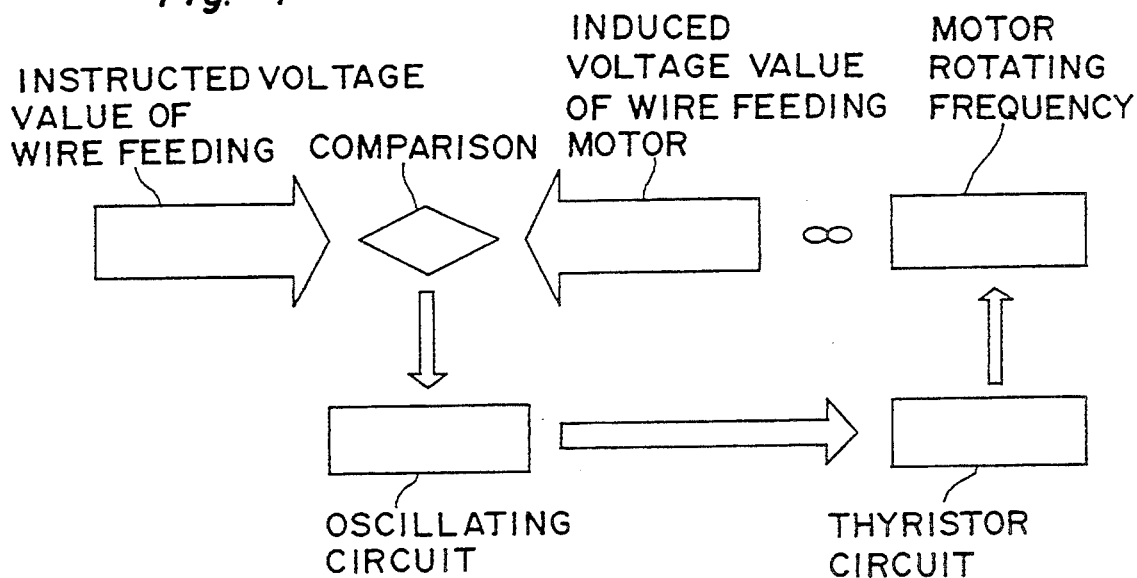
FIG. 4 is a diagram explanatory of the concept of a governor circuit of a wire feeding motor.

In the welding robot system in FIG. 2, when the arc welding is started, amount of the wire 9 proportional to an instruction value of a welding current is fed to the work 8 via the torch 5 by the wire feeding device 3 shown in FIG. 3, and thus the wire 9 is welded to the work 8 by the welding current running through the parent metal 7. At this time, a wire feeding motor 10 within the wire feeding device 3 in FIG. 3 is driven by a motor governor circuit for feeding the wire 9 (not shown) arranged inside the welding source 2 of FIG. 2. The motor governor circuit detects an induced voltage of the wire feeding motor 10 in proportion to the rotating frequency of the motor 10 and then compares, at predetermined cycles, the value of the induced voltage with a value of an instructed voltage, thereby controlling the wire feeding motor 10. As a result of the comparison, if the actual rotating frequency of the wire feeding motor 10 (induced voltage value of the wire feeding motor 10) is smaller than the rotating frequency corresponding to the instructed value of the voltage, a signal is transmitted to an oscillating circuit to increase the oscillation frequency and the firing angle (phase) of a thyristor is widened by a thyristor circuit (gate circuit), so that the wire feeding motor 10 is controlled in a direction to speed up the rotation. On the contrary, if the actual rotating frequency of the wire feeding motor 10, i.e. the induced voltage value is larger than the instructed voltage value, another signal is fed to the oscillating circuit to reduce the oscillation and the firing angle (phase) of the thyristor is narrowed to control the wire feeding motor 10 to slow the rotation. When the induced voltage value is equal to the instructed voltage value, the present state is maintained. The motor governor circuit feeds back the induced voltage of the wire feeding motor 10 to perform the above comparison and control of the wire feeding motor 10 at predetermined cycles as above, so that the welding wire can be fed stably with high accuracy and moreover at equal speeds, whereby the welding state is stable. A reduction gear of 1/25 reduction rate is interposed in the wire feeding device 3 of FIG. 3 between the wire feeding motor 10 and a feed roller 11 which actually sends out the wire 9.

Figure 5:
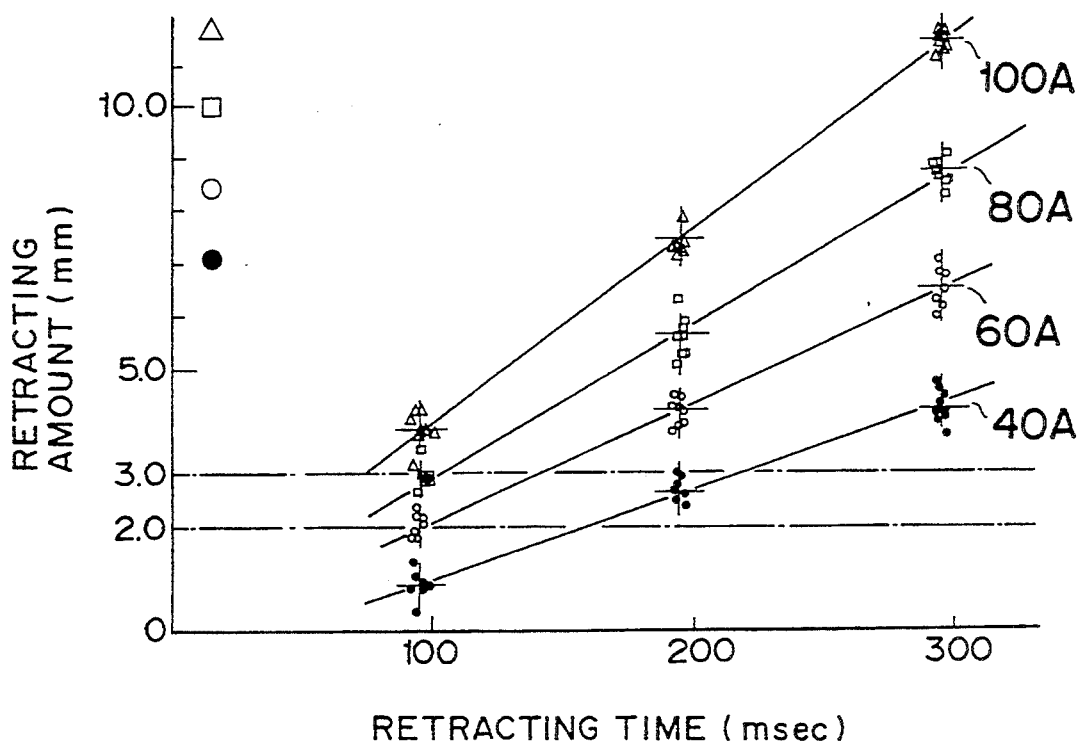
FIG. 5 is a graph of experimental results of the retracting accuracy of a wire.
Figure 8:
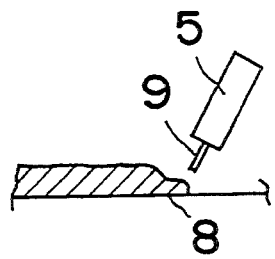
FIGS. 8, 9, and 10 are diagrams showing positional relationship between a wire and a work after being arc-welded.
Figure 9:
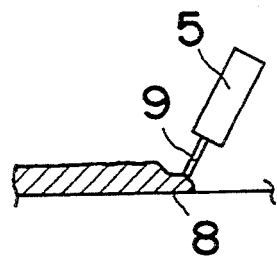
Figure 10:
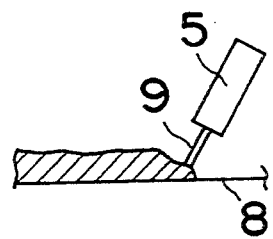

Now, the accuracy when the wire 9 is lifted by the wire feeding motor 10 (referred to as the "retracting accuracy" hereinafter) is described below. Since an instructed voltage of the rotation of the wire feeding motor 10 is proportional to an instructed value of the welding current, the instructed voltage of the wire feeding motor 10 is increased as the instructed value of the welding current becomes large, and in consequence, the actual rotating frequency of the wire feeding motor 10 is increased. The retracting amount of the welding wire 9 is therefore controlled by the instructed value of the welding current and the driving time of the wire feeding motor 10. The result of experiments is indicated in a graph of FIG. 5. In order to retract the welding wire 9 by 2 to 3 mm corresponding to the play amount of the welding wire 9, it is understood from the graph that such combinations of the instructed value of the welding current and the driving time of the wire feeding motor 10 as (40A, 200 msec), (60A, 120 msec), (80A, 85 msec) and the like can be employed. Although the experiments of FIG. 5 are based on the condition that the motor governor circuit for the wire feeding motor 10 is separated 7 m from the wire feeding motor 10, after similar experiments were carried out with the length of the cable between the motor governor circuit and the wire feeding motor 10 being variously changed, the combination (40A, 200 msec) was selected to retract the wire 9 by 2 to 3 mm corresponding to the play amount of the wire 9. Accordingly, the retracting amount of the welding wire 9 is controlled while both the instructed value of the welding current and the driving time of the wire feeding motor 10 are fixed using the relationship therebetween obtained from the experiments. Since the welding wire 9 has approximately 2 to 5 mm play amount in general conduit tubes, feeding system, or the like, even when the welding wire 9 is not separated from the work 8 after the welding as in the state shown in FIG. 10, the torch 5 or the robot is prevented from being broken only if the wire 9 is retracted 2 to 3 mm. When the welding wire 9 subjected to the welding is to be changed to the state of FIG. 8 from the state of FIG. 10 by an arc spot welding, if the instructed value of the welding current is 200A and the instructed welding voltage value is 23.6 V for $CO_2$ welding of $\phi 1.2$ mm diameter wire, the wire can be fused positively, that is, without accompanying re-sticking, and therefore, a next arc welding process is started promptly. It has been already known that as long as the above-described welding condition (fusing condition) is not missed very much, the welded wire can be cut without failure once the arc spot welding is carried out.

The operation of the first embodiment of the present invention is shown in FIG. 1. A determination is made as to whether or not the welding torch is permitted to move after one welding process. After the supply of the welding wire 9 is stopped at the completion of one welding process, the welding voltage is cut-off and thus the welding arc is extinguished at step #1. The presence/absence of a shortcircuit between the work 8 and the wire 9 is detected so as the thereby detect whether or not the wire 9 is welded to the work 8 at step #2. In the absence of the weld of the wire 9 to the work 8 at step #2, the torch 5 is immediately moved to a next welding process at step #8. If the wire 9 is determined to be welded to the work 8 at step #2, the wire 9 is retracted 2 to 3 mm by the wire feeding motor at step #3. Thereafter, a determination is made as to whether or not the wire 9 is welded to the work 8 at step #4, and if the wire 9 is not welded, the torch 5 is moved to a next welding process at step #8. If the wire 9 is welded, the welded wire 9 is fused by an arc spot welding at step #5. Whether the wire 9 is welded to the work 8 is subsequently detected at step #6. The torch 5 is moved to a next welding process at step #8 without the weld of the wire 9 at step #6. When the wire 9 is determined to be welded to the work at step #6, the detection of the weld is displayed and the welding system is stopped at step #7. When the welded state has been detected, the robot is temporarily stopped to simultaneously turn "ON" two external outputs of "DURING STOP" and "ERROR" and then a "CANCEL" input from an external source such as an operator turns "OFF" the external output "ERROR" and an "EXTERNAL RE-START" input turns "OFF" the external output "DURING STOP". In the embodiment, at least one of the stopping of driving of the arc welding apparatus, the displaying of the welded state, and informing the welded state can be performed.

In the manner as described hereinabove, as shown in FIG. 1, a determination can be made as to whether or not the torch 5 can be moved after the welding.

Figure 6:
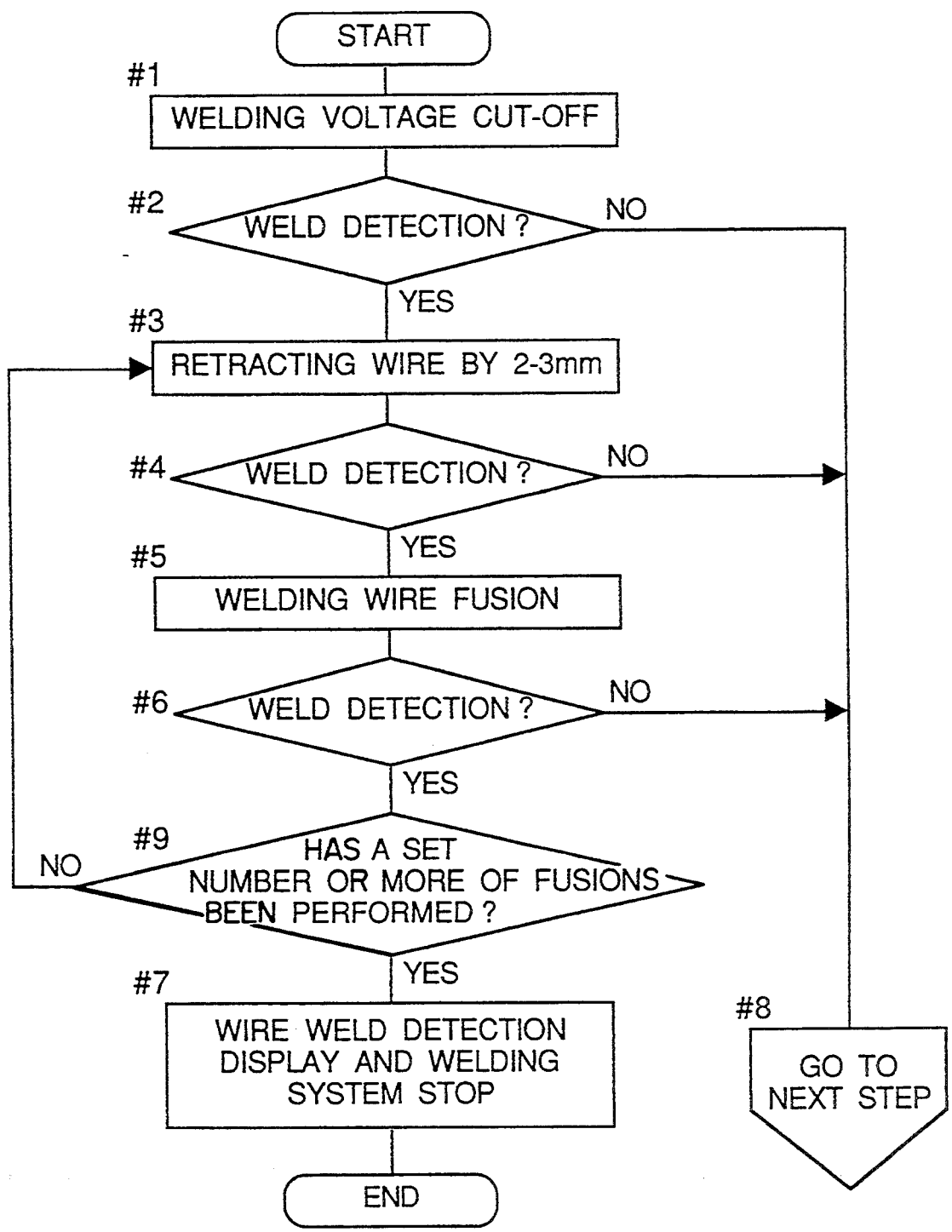
FIG. 6 is a flowchart of an arc welding method according to a second embodiment of the present invention.

FIG. 6 represents a second embodiment of the present invention. The description of the same points as those of the first embodiment will be abbreviated.

A different point is an addition of step #9 between steps #6 and #7. At step #9, a determination is made as to whether the executing number of times of step #6 has reached a set number of times when the weld has been detected at step #6, i.e., whether the number of times that the welding wire 9 has been fused at step #5 is not smaller than a set number of times. If the executing number of times does not reach the set number of times, the operation is returned to step #3, whereby the wire 9 is retracted, and moreover the wire 9 is fused by a further arc spot welding in the case where the weld is detected at step #4. When the set number of times is reached at step #9, then the detection of the weld of the wire 9 is displayed and the welding system is stopped at step #7. Accordingly, even if the wire 9 cannot be fused for the first time, the wire 9 is subjected to a further arc spot welding, thereby avoiding an interruption of the welding process. If the fusing number of times is set optionally for each part, the welding quality is properly balanced with the smoothness of the welding process.

Figure 7:
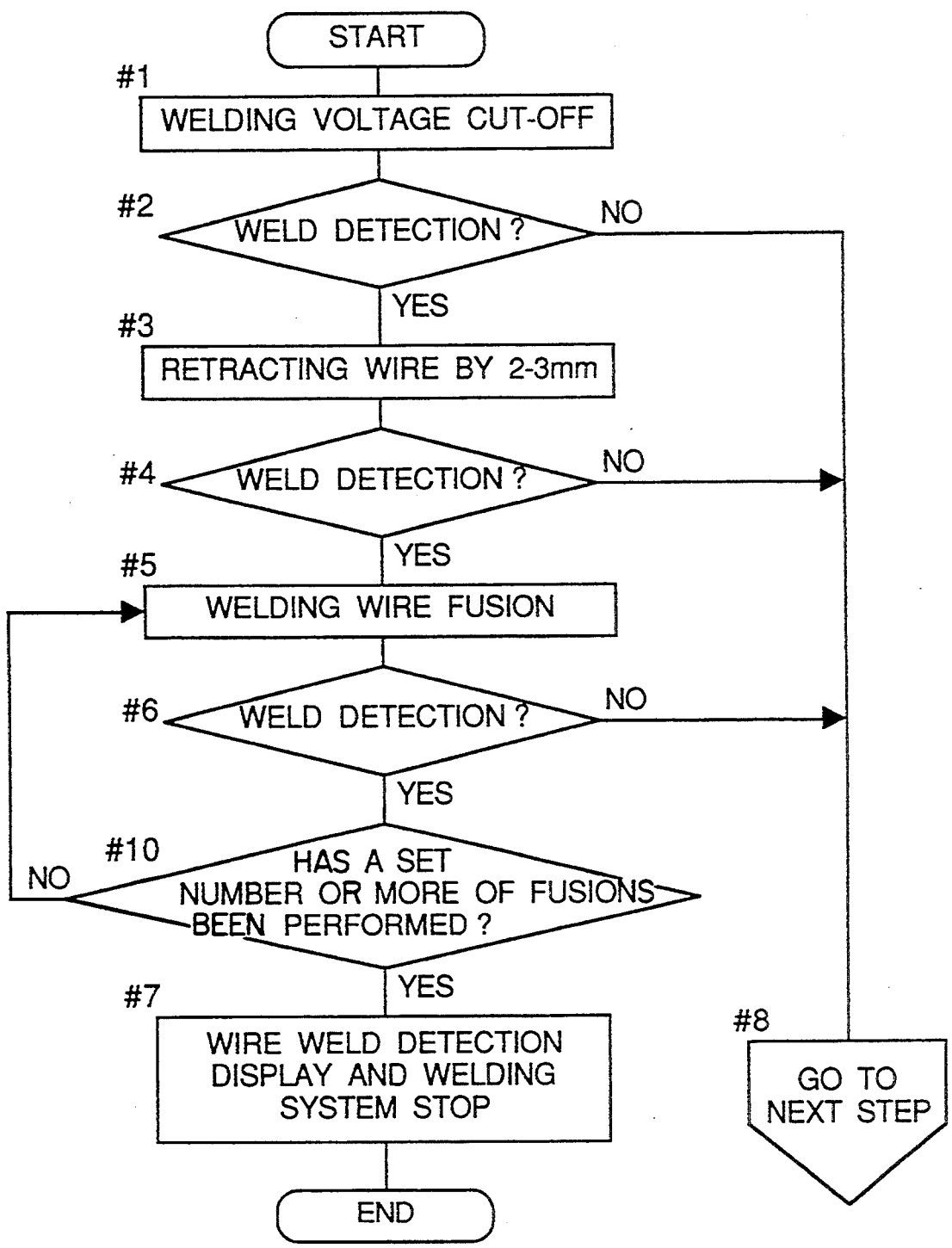
FIG. 7 is a flowchart of an arc welding method according to a third embodiment of the present invention.

The algorithm of a third embodiment of the present invention is illustrated in FIG. 7. The same points as those of the first and second embodiments will be omitted from the description below.

The third embodiment is different from the second embodiment in that step 310 is provided between steps #6 and #7, whereby a determination is made as to whether the wire 9 has been fused no less than a set number of times in the case where the weld of the wire 9 is detected at step 36, and then step #5 is resumed, and not step #3, if the set number of times has not complete. According to this arrangement, in comparison with the second embodiment, the retracting time of the welding wire 9 is eliminated and the efficiency is highly improved.

As is clear from the foregoing description of the present invention, any of three cases, namely, where the wire 9 is not welded to the work 8, where the wire 9 is pseudo-welded to the work 8, and where the wire 9 is welded to the work 8 is appropriately treated in the arc welding method. More specifically, the wire 9 is moved promptly when the wire 9 is not welded to the work 8. When the wire 9 is pseudo-welded to the work 8, the wire 9 is moved after being retracted by the distance corresponding to the play thereof. Moreover, when the wire 9 is welded to the work 8, the welded wire 9 is fused and thereafter the wire 9 is moved. Accordingly, the time for one welding process can be reduced. Since the pseudo-welded state is released by lifting the wire 9, it becomes unnecessary to move the weld torch 5 each time one welding is finished. The wire 9 is raised by the distance corresponding to the play thereof if the wire 9 is welded to the work 8, without moving the welding torch 5. Therefore, a holding part of the welding torch 5 is not broken, not like the case where the welding torch 5 itself is moved. Additionally, since the pseudo weld is detected by lifting the wire 9, a mechanism to move the welding torch 5 minutely is not needed.

Since in the second embodiment, the third step #3 to the wire 9 is executed again in the case where the weld is not effected by a spot welding, the weld can be released as soon as possible even if it is impossible after the first time. The welding process accordingly proceeds smoothly without an interruption.

It is an advantageous aspect of the third embodiment that when the weld is not released by a spot welding, the fifth step #5 is executed to perform a spot welding again without carrying out the third step #3 to lift the wire 9. The lifting time is eliminated.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A method of operating an arc welding apparatus which controls and moves a welding wire of a welding torch and detects a weld between a work and the welding wire after completion of an arc welding, comprising:

a first step of cutting off a welding voltage to the welding wire to thereby extinguish a welding arc;

a second step of detecting a welded state between the welding wire and the work;

a third step of lifting the welding wire away from the work when the welded state has been detected at the second step;

a fourth step of detecting the welded state between the welding wire and the work after completion of the third step;

a fifth step of impressing the welding voltage to the welding wire when a weld has been detected at the fourth step;

a sixth step of detecting the welded state between the welding wire and the work after completion of the fifth step;

a seventh step of executing, when the welded state has been detected at the sixth step, at least one of a stopping of the operation of the arc welding apparatus, displaying the welded state and informing an operator of the welded state; and an eighth step of moving the arc welding apparatus to another location when the welded state has not been detected at the second, fourth, and sixth steps.

2. The arc welding method as claimed in claim 1, further comprising another step, provided between the sixth step and seventh step, of detecting whether the number of times that the apparatus during the sixth step has detected the welded state has reached a set number of times, and returning the apparatus to the third step when the number of times has not reached the set number of times, and causing the apparatus to proceed to the seventh step when the number of times has reached the set number of times.

3. The arc welding method as claimed in claim 1, further comprising another step, provided between the sixth step and the seventh step, of detecting whether the number of times that the apparatus during the sixth step has detected the welded state has reached a set number of times, and returning the apparatus to the fifth step when the number of times has not reached the set number of times, and causing the apparatus to proceed to the seventh step when the number of times has reached the set number of times.

* * * * *